United States Patent
Santillan Gutierrez et al.

(10) Patent No.: US 10,507,771 B2
(45) Date of Patent: *Dec. 17, 2019

(54) W-SHAPED WINGED SPRING CLIP

(71) Applicant: FORD GLOBAL TECHNOLOGIES, LLC, Dearborn, MI (US)

(72) Inventors: Diego Santillan Gutierrez, Tizayuca (MX); Fernando Paisano Rodriguez, San Andres Cholula (MX); Jose Alfredo Peregrina Loera, México City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 289 days.

This patent is subject to a terminal disclaimer.

(21) Appl. No.: 15/131,633

(22) Filed: Apr. 18, 2016

(65) Prior Publication Data
US 2017/0297506 A1 Oct. 19, 2017

(51) Int. Cl.
*F16B 2/22* (2006.01)
*B60R 13/00* (2006.01)

(52) U.S. Cl.
CPC .............. *B60R 13/00* (2013.01); *F16B 2/22* (2013.01)

(58) Field of Classification Search
CPC .... F16B 2/22; F16B 2/24; F16B 2/241; F16B 2/243; F16B 5/0607; F16B 5/0642; F16B 5/065; F16B 17/00; F16B 5/0657; F16B 21/086; B60R 13/00; Y10T 24/309; Y10T 24/304; Y10T 24/306; Y10T 24/307; Y10T 24/308; Y10T 24/44026; Y10T 24/42
See application file for complete search history.

(56) References Cited

U.S. PATENT DOCUMENTS

| | | | |
|---|---|---|---|
| 3,015,866 A | 1/1962 | Elms et al. | |
| 3,210,032 A | 10/1965 | Van Slyke | |
| 3,588,151 A * | 6/1971 | Korenz | F16B 2/241 138/106 |
| 3,811,154 A | 5/1974 | Linderman et al. | |
| 3,852,849 A | 12/1974 | Pestka | |
| 3,889,320 A | 6/1975 | Koscik | |
| 3,921,261 A | 11/1975 | Fisher | |
| 4,337,774 A | 7/1982 | Perlin | |
| 4,619,365 A | 10/1986 | Kelly et al. | |
| 4,811,922 A | 3/1989 | Yoneyama | |
| 4,927,306 A | 5/1990 | Sato | |
| 5,014,952 A | 5/1991 | Petrohilos | |
| 5,191,513 A | 3/1993 | Sugiura et al. | |
| 5,689,863 A | 11/1997 | Sinozaki | |
| 6,012,691 A | 1/2000 | van Leeuwen et al. | |
| 6,079,486 A | 6/2000 | Cennamo et al. | |
| 7,036,779 B2 | 5/2006 | Kawaguchi et al. | |
| 7,152,281 B2 | 12/2006 | Scroggie | |

(Continued)

FOREIGN PATENT DOCUMENTS

| | | | | |
|---|---|---|---|---|
| FR | 2594186 A1 * | 8/1987 | | F16B 2/248 |
| WO | WO-2012092473 A1 * | 7/2012 | | F16B 5/065 |

*Primary Examiner* — Jack W Lavinder
(74) *Attorney, Agent, or Firm* — Vichit Chea; King & Schickli, PLLC

(57) ABSTRACT

A spring clip is provided. That spring clip includes a body having a support post, a first cantilever bar and a second cantilever bar. Junctures between the cantilever bars and the support post include necks and bends. S-curve segments are provided at the ends of those bends.

7 Claims, 4 Drawing Sheets

(56) References Cited

U.S. PATENT DOCUMENTS

| | | |
|---|---|---|
| 7,320,157 B2 | 1/2008 | Lubera et al. |
| 7,351,023 B2 | 4/2008 | Scroggie et al. |
| 7,354,102 B2 | 4/2008 | Cave et al. |
| 7,549,830 B2 | 6/2009 | Cooley et al. |
| 7,878,749 B2 | 2/2011 | Edland |
| 7,950,115 B2 | 5/2011 | Spitz |
| 8,109,705 B1 | 2/2012 | Brown et al. |
| 8,936,420 B2 * | 1/2015 | Scroggie ................ F16B 5/065 411/45 |
| 8,979,460 B2 | 3/2015 | Ostergren |
| 9,079,341 B2 | 7/2015 | Risdale et al. |
| 9,121,426 B2 | 9/2015 | Jagoda |
| 2003/0156917 A1 | 8/2003 | Heflin et al. |
| 2005/0236861 A1 * | 10/2005 | Slobodecki ......... B60R 13/0206 296/39.1 |
| 2006/0230586 A1 | 10/2006 | Maki et al. |
| 2007/0125004 A1 | 6/2007 | Conner et al. |
| 2007/0125729 A1 | 6/2007 | Krueger |
| 2008/0066266 A1 | 3/2008 | Scroggie et al. |
| 2011/0197405 A1 | 8/2011 | Kato et al. |
| 2012/0257924 A1 | 10/2012 | Andrews |
| 2013/0011188 A1 | 1/2013 | Donnelly |

* cited by examiner

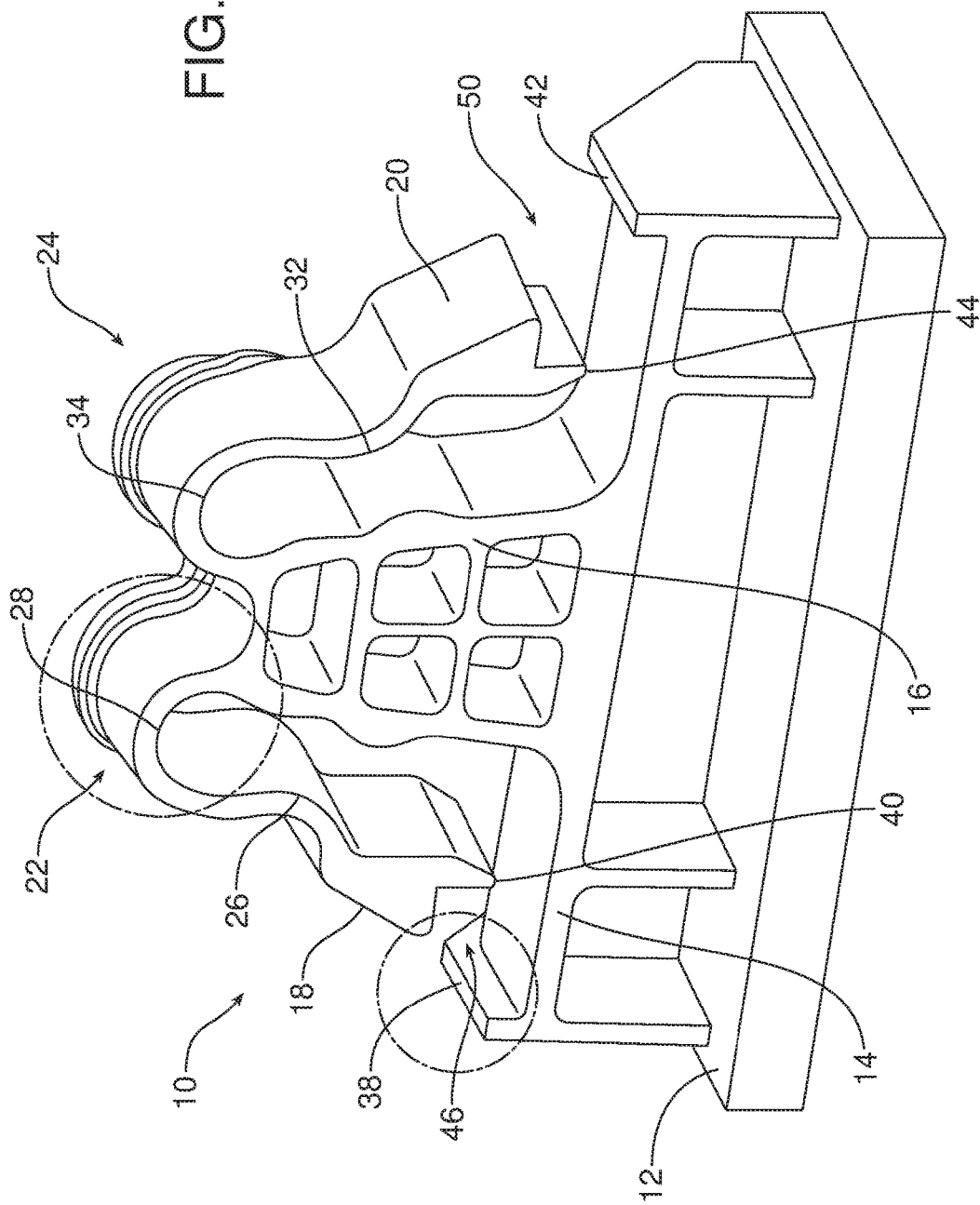

W-SHAPED WINGED SPRING CLIP

TECHNICAL FIELD

This document relates generally to the fastener field and, more particularly, to a new and improved W-shaped winged spring clip that is particularly useful in automotive applications to connect plastic parts to sheet metal.

BACKGROUND

Various types of fasteners including, for example, bolts/nuts, metal clips, plastic clips or the like may be utilized to secure a plastic part to a substrate such as a sheet metal part. Significantly, every added fastener increases the part cost and the weight of the assembly.

More specifically, fastener usage requires additional operations at the assembly plant or at the plastic part manufacturer and every additional operation increases the required manpower, process cost and production timing. In addition each fastener has a risk of producing squeaks and rattles. Further, added, separate fasteners have the risk of being missing or mismatched during product assembly.

This document relates to a new and improved W-shaped winged spring clip which may be molded as an integral component of the plastic part. Advantageously, the spring clip includes double blocked lateral wings or cantilever bars structured to dissipate stress concentrations. The spring clip eliminates the need for additional, separate fasteners thereby reducing the weight and cost of the assembly. It also provides a robust and stronger joint between parts while substantially eliminating the risk of squeaks and rattles.

The spring clip also includes lateral ribs that add extra stiffness. Further, the spring clip has a low insertion effort and functions to locate, lock and retain parts together in a single snapping action.

SUMMARY

In accordance with the purposes and benefits described herein, a spring clip is provided. That spring clip comprises a body including (a) a support post, (b) a first cantilever bar and (c) a first juncture between the support post and the first cantilever bar that includes a first bend having an S-curve segment at each end.

Further, the spring clip may include a second cantilever bar and a second juncture between the support post and the second cantilever bar that includes a second bend having an S-curve segment at each end.

In one possible embodiment, the body has a W-shape. Further, the body includes a base and the support post projects from that base.

In addition, the spring clip may include a first tunable rib carried on the base adjacent a first distal end of the first cantilever bar. That first distal end may include a first double blocked notch. Further, that first double blocked notch may include a first mid point angle and a first radiused face.

In addition, the spring clip may include a second tunable rib carried on the base adjacent a second distal end of the second cantilevered bar. That second distal end may include a second double blocked notch which may also include a second mid point angle and a second radiused face.

In accordance with an additional aspect, a method is provided for dissipating stress concentrations in a W-shaped spring clip. That method comprises the step of forming a bend between a cantilever bar and a support post of the W-shaped spring clip with an S-curve segment at each end of the bend.

Further, the method may include forming a second bend between a second cantilever bar and the support post of the W-shaped spring clip with a second S-curve segment at each end of the second bend. In addition, the method may include providing the W-shaped spring clip with tunable ribs. Further, the method may include providing the distal ends of the cantilever bars with double blocked notches.

In the following description, there are shown and described several preferred embodiments of the spring clip. As it should be realized, the spring clip is capable of other, different embodiments and its several details are capable of modification in various, obvious aspects all without departing from the spring clip as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the spring clip and together with the description serve to explain certain principles thereof. In the drawing figures:

FIG. 1 is a detailed perspective view of the spring clip clearly illustrating the W-shaped body having a base, a support post and first and second cantilever bars.

Reference will now be made in detail to the present preferred embodiments of the spring clip, examples of which are illustrated in the accompanying drawing figures.

DETAILED DESCRIPTION

Figure 1A:
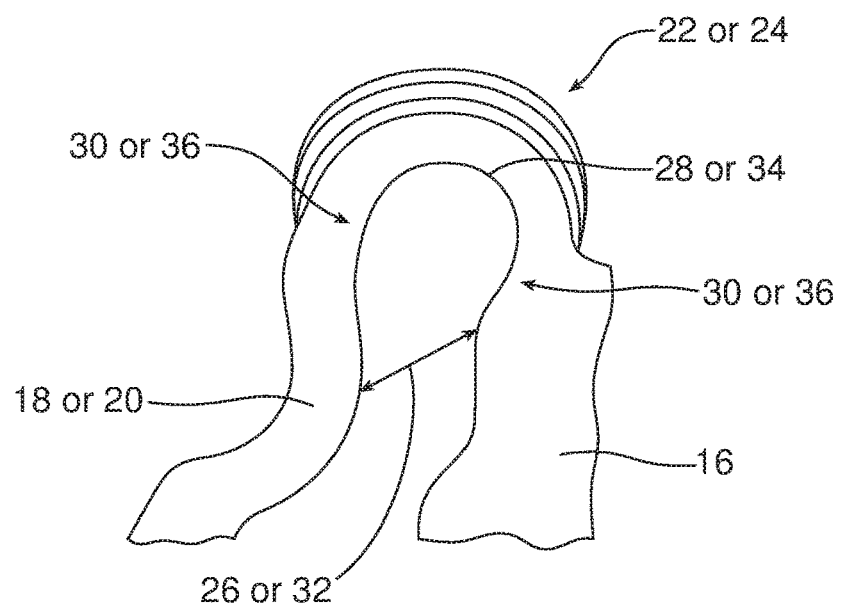
FIG. 1a is a detailed side elevational view of a juncture between the support post and one of the cantilever bars.
Figure 1B:
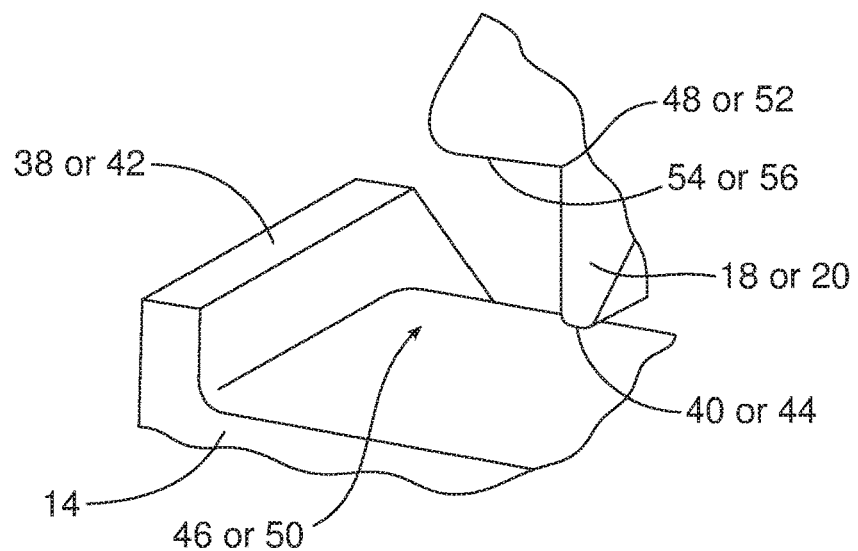
FIG. 1b is a detailed perspective view of one of the tunable ribs carried on the base adjacent a distal end of one of the cantilevered bars.
Figure 1C:
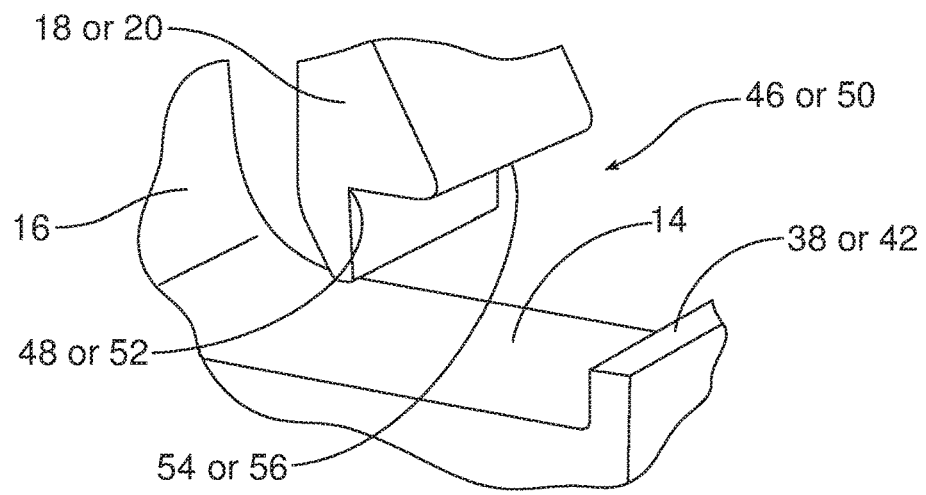
FIG. 1c is a detailed perspective view of a double blocked notch provided at a distal end of one of the cantilever bars.
Figure 1D:
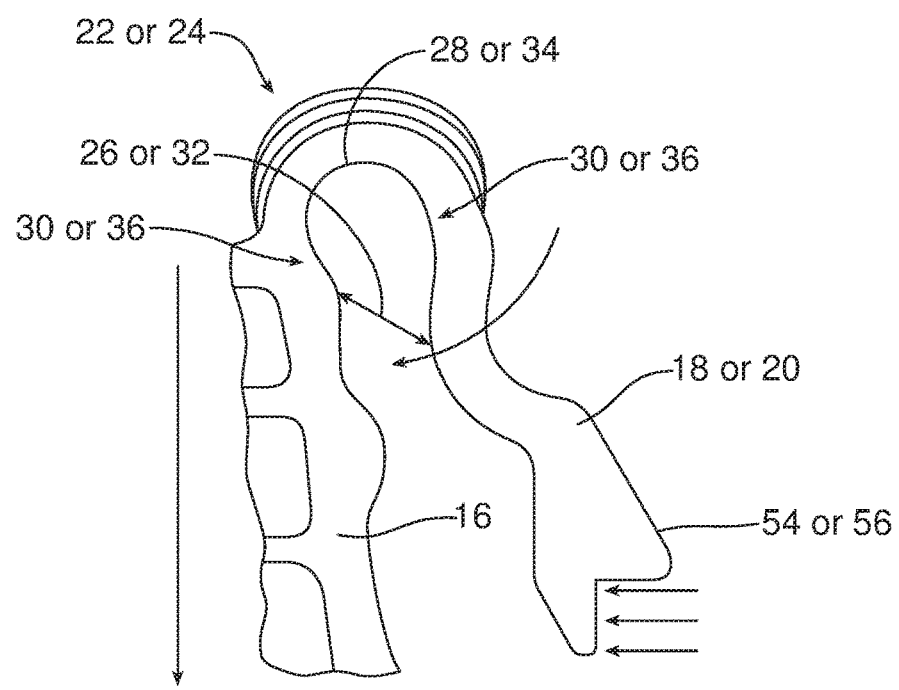
FIG. 1d is a side elevational view of one of the cantilever bars illustrating the bending action when one releases the spring clip from an engaged position in order to separate work pieces being connected by the spring clip.

Reference is now made to FIGS. 1-1d which illustrate the spring clip 10 in detail. As illustrated, the spring clip 10 includes a body 12 of substantially W-shape. The body 12 includes a base 14 and a central support post 16 projecting from the base in a substantially perpendicular manner.

The body 12 also includes a first cantilever bar 18 and a second cantilever bar 20. A first juncture 22 is provided between and connects the first cantilever bar 18 to a first side of the support post 16. A second juncture 24 is provided between and connects the second cantilever bar 20 to an opposite side of the support post 16.

As best illustrated in FIG. 1a, the first juncture 22 includes a relatively narrow neck 26 that opens to a first bend 28. As should be appreciated, the first neck 26 and first bend 28 define an S-curve segment 30 at each end of the first bend 28.

Similarly, the second juncture 24 includes a second neck 32 and a second bend 34 with the second neck and second bend forming a second S-curve segment 36 at each end of the second bend 34.

As best illustrated in FIGS. 1 and 1b, a first tunable rib 38 is carried on the base 14 adjacent a first distal end 40 of the first cantilever bar 18. Similarly, a second tunable rib 42 is carried on the base 14 adjacent a second distal end 44 of the second cantilever bar 20. The function of the tunable ribs 38, 42 will be described in detail below.

As best illustrated in FIGS. 1 and 1c, the first distal end 40 of the first cantilever bar 18 includes a first double blocked notch 46 having a first mid point angle at 48. Similarly, the second distal end 44 of the second cantilever bar 20 includes a second double blocked notch 50 having a second mid point angle at 52. The function of the double blocked notches 46, 50 will be described in detail below.

Figure 2:
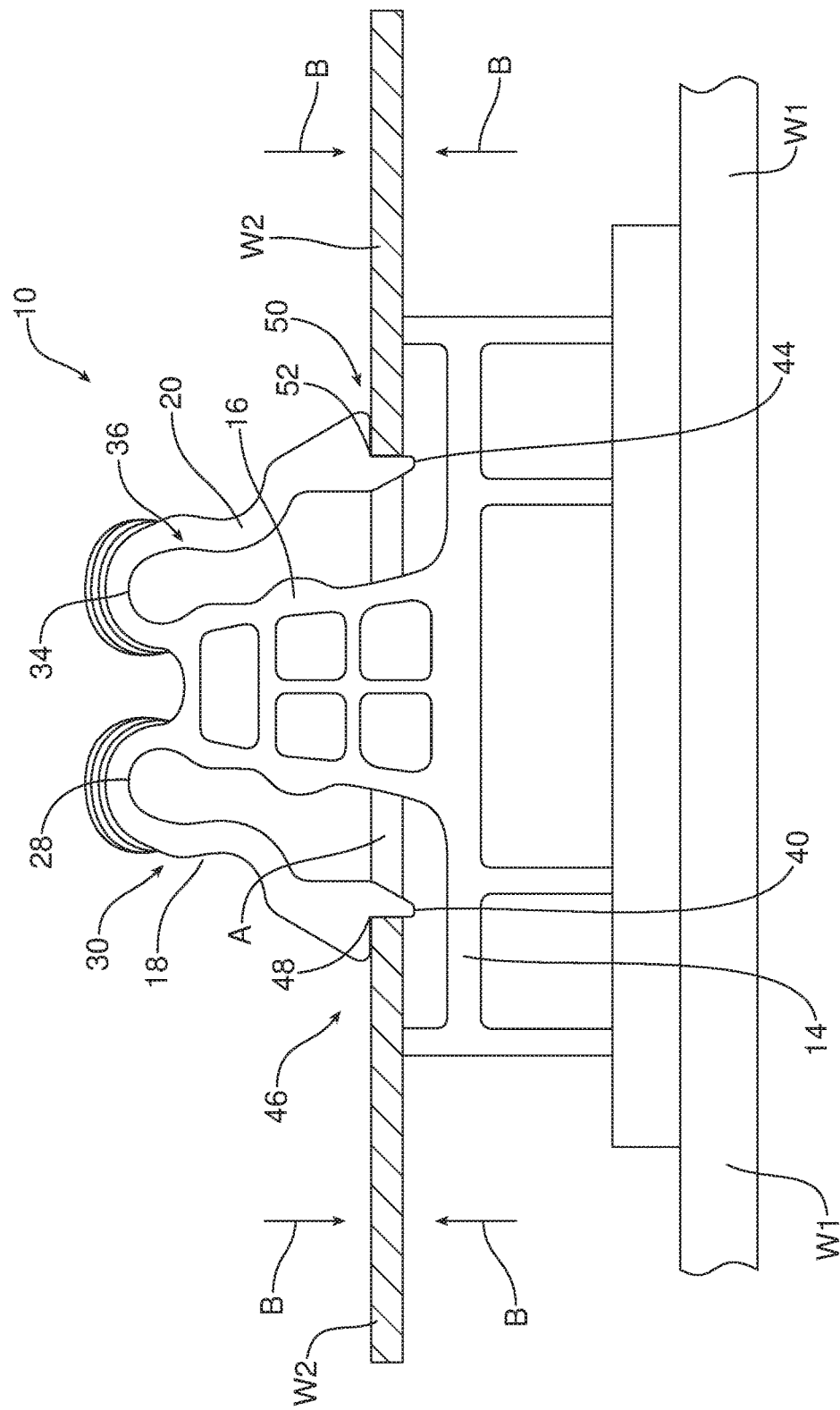
FIG. 2 is a side elevational view illustrating how the spring clip connects two work pieces together.

Reference is now made to FIG. 2 illustrating the spring clip 10 integrally molded as a part of a plastic work piece W1. As illustrated, work piece W1 is connected to work piece W2, made from sheet metal, by aligning the spring clip 10 with a mounting aperture A and pushing the two work pieces together in the direction of action arrows B. As this is done, the cantilever bars 18, 20 on the spring clip 10 bend inwardly toward the support post 16 until the notches 46, 50 at the distal ends 40, 44 of the support bars pass through the aperture A. At that time, the resilient memory of the material for which the spring clip 10 is molded causes the cantilever bars 18, 20 to flex outwardly away from the support post 16 until the notches 46, 50 engage the ends of the mounting aperture A.

When the two work pieces W1, W2 are properly secured together, the ends of the aperture A engage in the notches 46, 50 at about the mid point angles 48, 52. The outwardly projecting faces 54, 56 of the notches 46, 50 prevent the spring clip 10 from pulling out of the mounting aperture A. The tunable ribs 38 and 42 may be adjusted in height to ensure that the mounting aperture A in the work piece W2 engages at the mid point angles 48, 52 of the two notches 46, 50 thereby eliminating any play and the risk of squeaks and rattles.

Should it ever become necessary to disconnect the work piece W1, W2 for service or any other reason, it is possible to pry the work pieces apart and overcome the resilient holding power of the spring clip 10. When this is done, the ends of the mounting aperture A slide up the radiused outer or upper faces 54, 56 of the notches 46, 50 causing the two cantilever bars 18, 20 to bend slightly inward toward the support post 16 until the aperture is free of the notches to allow easy separation of the work pieces W1, W2. Note FIG. 1d illustrating the action of one cantilever bar 18 during the disassembly operation. The other cantilever bar 20 moves and functions in the same manner.

During assembly or disassembly, the junctures 22, 24 function as stress concentration dissipaters to ensure that the assembly and disassembly processes will not apply any forces to the spring clip 10 that are above the yield strength of the material from which the spring clip is made. More specifically, the S-curve segments 30, 36 provided at the ends of the respective first and second bends 28, 34 where those bends meet the first and second necks 26, 32 increases the length and radius of the bend thereby distributing the stress over a larger area which dissipates any stress concentration.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A spring clip, comprising:
a body including (a) a support post, (b) a first cantilever bar having a first distal end, (c) a first juncture between said support post and said first cantilever bar, (d) a single S-curve segment extending between said first juncture and said first distal end (e) a base, said support post projecting from said base and (f) a first tunable rib carried on said base adjacent said first distal end of said first cantilever bar wherein said body further includes a second cantilever bar having a second distal end, a second juncture between said support post and said second cantilever bar and a second single S-curve segment extending between said second juncture and said second distal end and wherein said body has a W-shape and said first distal end includes a first double blocked notch.

2. The spring clip of claim 1, wherein said first double blocked notch includes a first mid point angle and a first radiused face opening outward away from said support post.

3. The spring clip of claim 2, further including a second tunable rib carried on said base adjacent said second distal end of said second cantilevered bar.

4. The spring clip of claim 3, wherein said second distal end includes a second double blocked notch.

5. The spring clip of claim 4, wherein said second double blocked notch includes a second mid point angle and a second radiused face opening outward away from said support post.

6. The spring clip of claim 5, wherein said support post and said first cantilever bar includes a first neck.

7. The spring clip of claim 6, wherein said support post and said second cantilever bar includes a second neck.

* * * * *